United States Patent [19]
Ferro

[11] Patent Number: 5,774,871
[45] Date of Patent: Jun. 30, 1998

[54] SYSTEM AND METHOD FOR CREATING A FOOD ORDER SALES RECEIPT IDENTIFYING NUTRITIONAL INFORMATION OF A CUSTOMIZED MEAL

[76] Inventor: Jay Ferro, 6780 Trigo Rd., Goleta, Calif. 93117

[21] Appl. No.: 506,441

[22] Filed: Jul. 24, 1995

[51] Int. Cl.$^6$ .................................................. G06F 17/60
[52] U.S. Cl. .............................. 705/15; 705/16; 128/931; 128/630
[58] Field of Search .................................. 395/224, 216, 395/215; 706/15, 16; 600/300; 128/630, 921

[56] References Cited

U.S. PATENT DOCUMENTS

| | | |
|---|---|---|
| 4,807,169 | 2/1989 | Overbeck . |
| 4,833,308 | 5/1989 | Humble . |
| 4,891,756 | 1/1990 | Williams, III . |
| 4,911,256 | 3/1990 | Attikiouzel . |
| 4,954,954 | 9/1990 | Madsen et al. . |
| 5,033,561 | 7/1991 | Hettinger . |
| 5,127,880 | 7/1992 | Bar et al. . |
| 5,412,564 | 5/1995 | Ecer . |
| 5,558,742 | 9/1996 | Kiefer ................................ 156/244.16 |

FOREIGN PATENT DOCUMENTS

| | | | |
|---|---|---|---|
| 62-103764 | 5/1987 | Japan ............................. | G06F 15/21 |
| 0472767 | 6/1992 | Japan ............................. | G06F 15/21 |

*Primary Examiner*—Gail O. Hayes
*Assistant Examiner*—William N. Hughet
*Attorney, Agent, or Firm*—Townsend and Townsend and Crew LLP

[57] ABSTRACT

A food order content receipt that is presented to customers of food preparation establishments to report individualized nutritional information of meal items prepared and served. A method of receiving a service order having one or more meals, each meal made up of one or more meal items prepared using standardized meal components. A report listing the specific nutritional content of the standardized and customized meal items is provided to the customer.

18 Claims, 6 Drawing Sheets

Subs R Us

24-Jul-95
1:54 PM

| | Price | Calories | Fat (g) |
|---|---|---|---|
| Roast Beef sand. | $4.00 | 450 | 12 |
| No Mayonaise | - | -45 | -2 |
| add pickles | - | +10 | +1 |
| Large Cola | $1.00 | 120 | 2 |
| Sub-Total Meal I | $5.00 | 535 | 13 |
| 1/2 Chicken sand. | $3.00 | 210 | 6 |
| No Cheese | - | -35 | -1 |
| Small Cola | $0.75 | 80 | 1 |
| Sub-Total Meal II | $3.75 | 255 | 6 |
| TOTAL | $8.75 | | |

Meal 1: Roast beef is high in Vitamin B which is excellent for the skin.

Meal 2: The chicken sandwich supplies 75% of the daily recommended amount of iron.

FIG_1

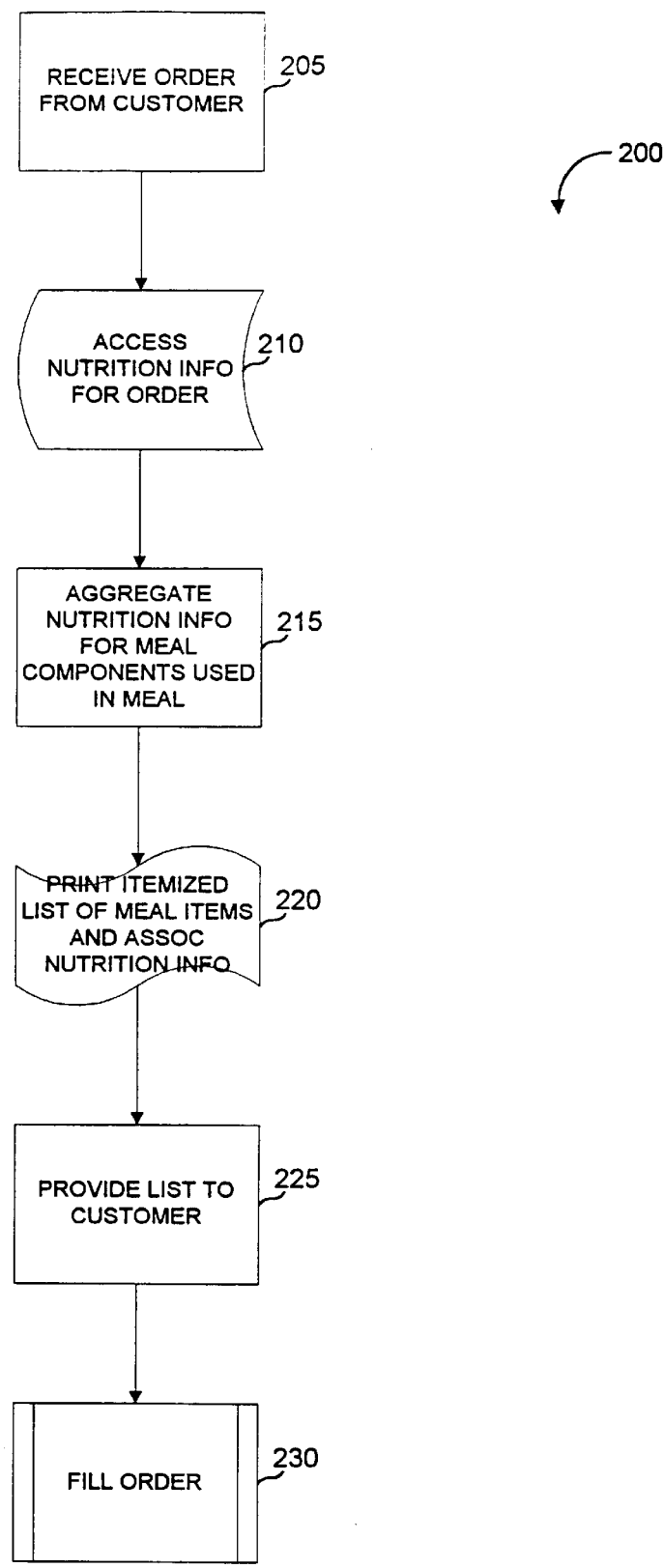
FIG_2

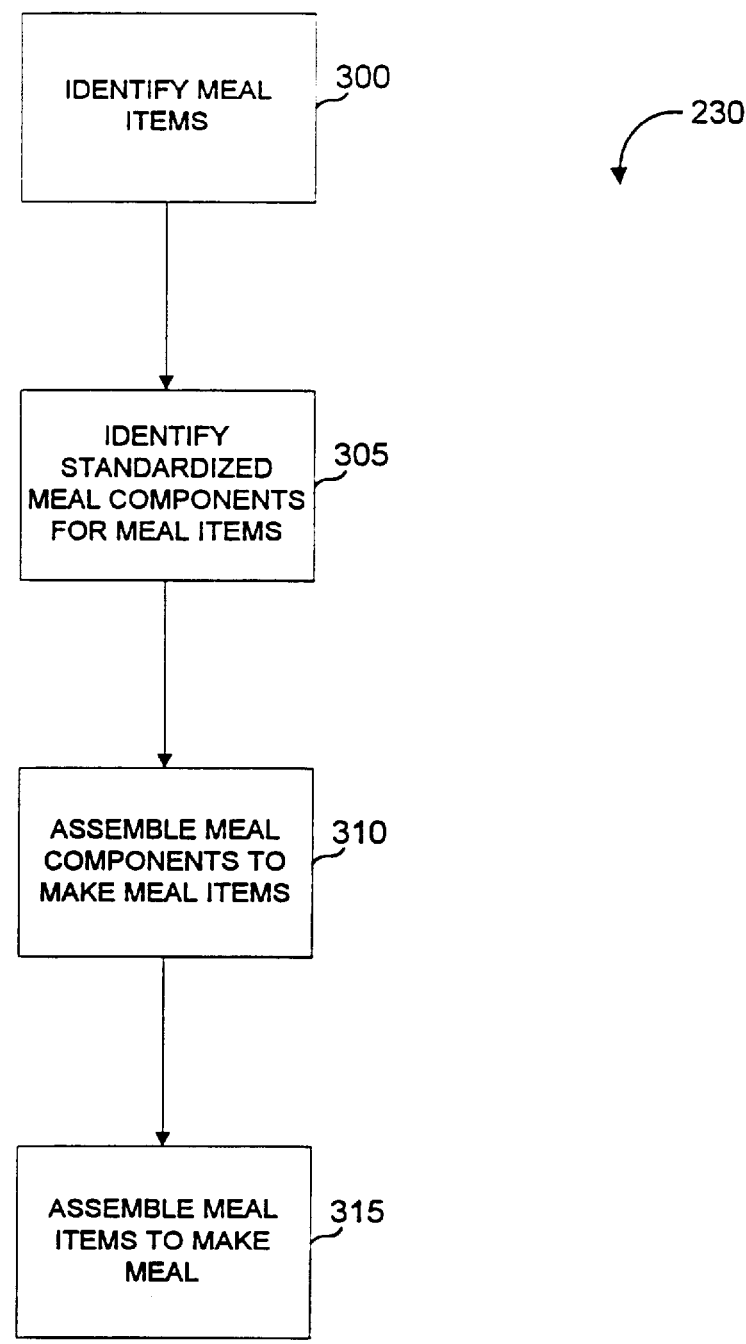
FIG_3

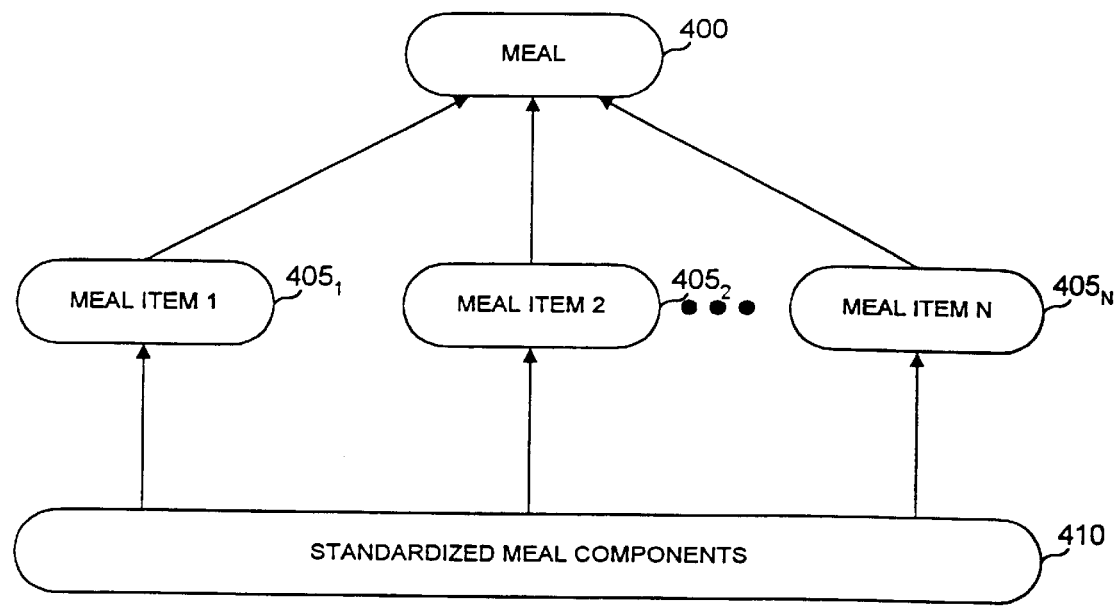
FIG_4
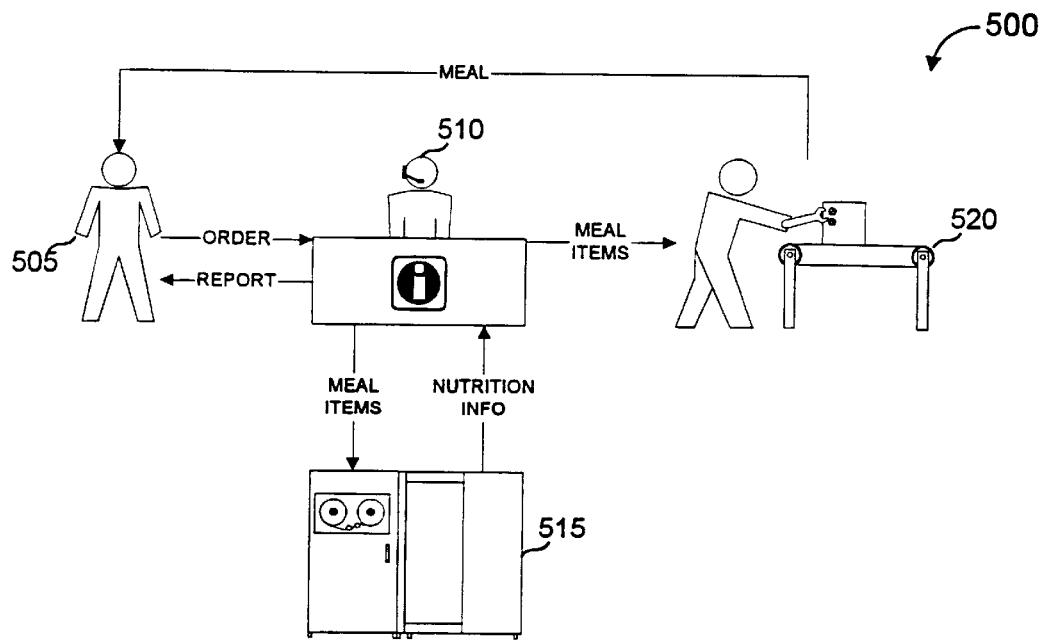
FIG_5

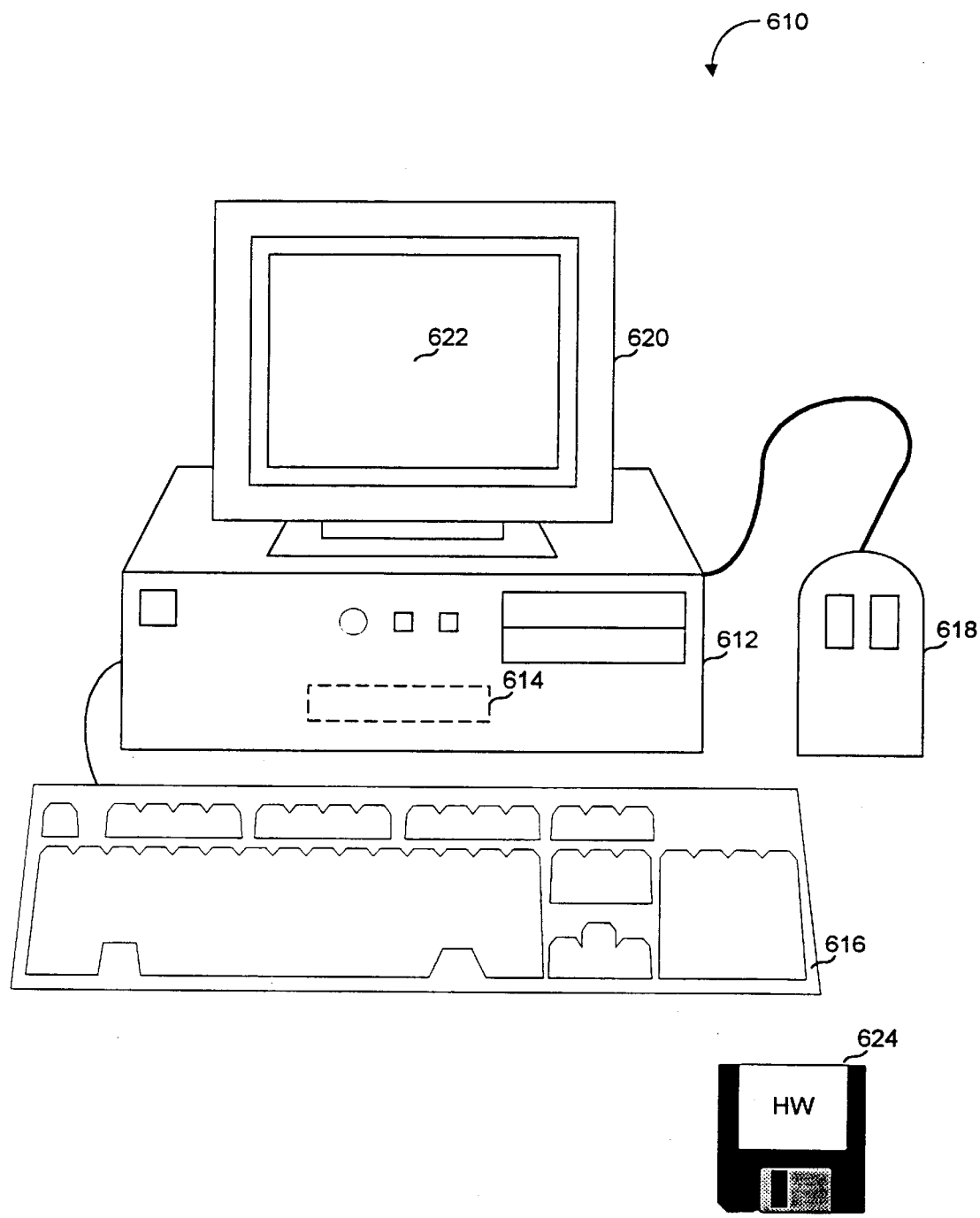
FIG_6

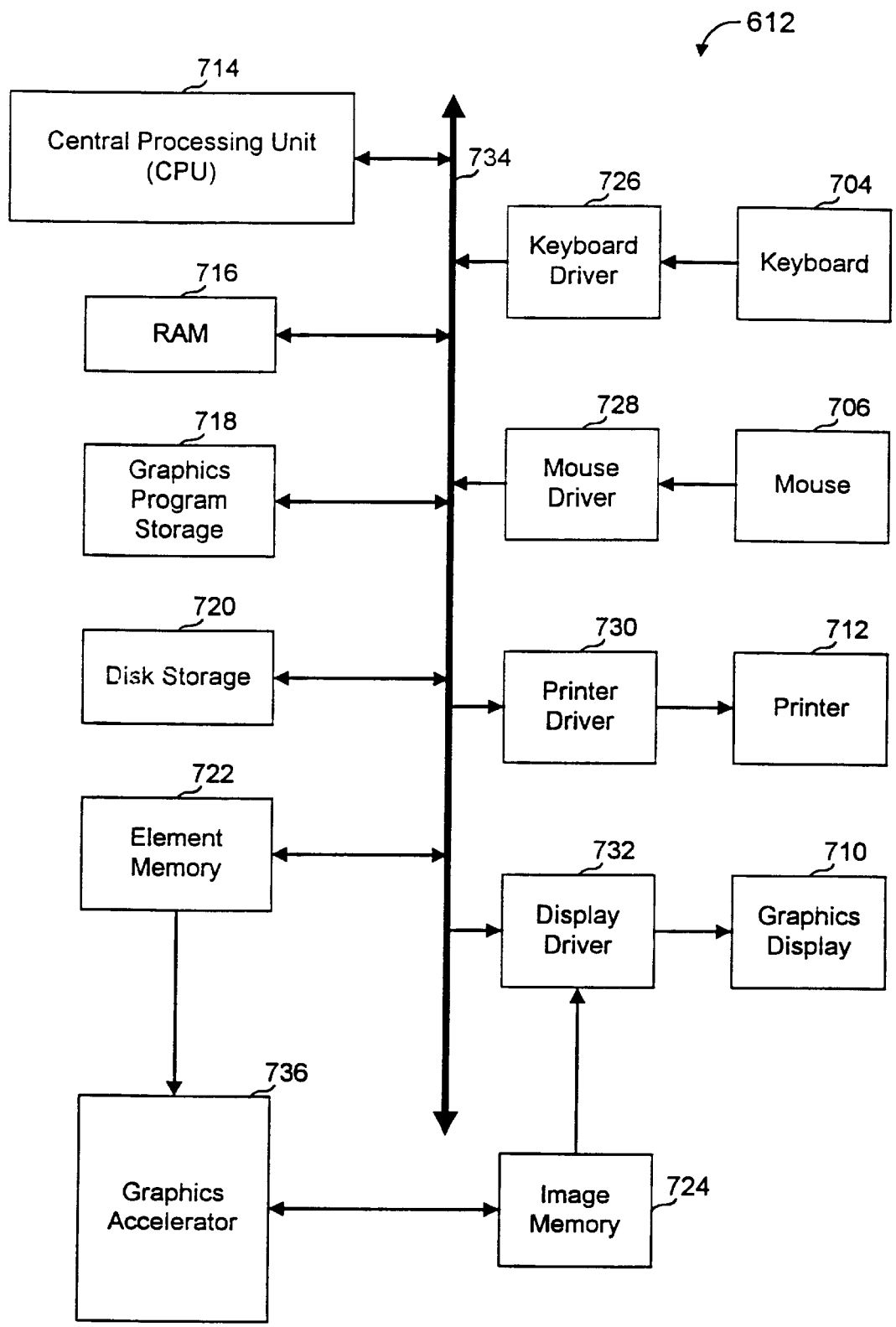
FIG_7

SYSTEM AND METHOD FOR CREATING A FOOD ORDER SALES RECEIPT IDENTIFYING NUTRITIONAL INFORMATION OF A CUSTOMIZED MEAL

BACKGROUND OF THE INVENTION

The present invention relates generally to improvements in reporting of nutritional information to consumers, and more specifically to itemized reporting of nutritional information of specific food items served to a patron of a meal preparation establishment.

Consumers are becoming increasingly aware of food they eat and associated nutritional information of specific meal items. The prior art includes many instances of dietetic and nutritional information systems for use at home or when purchasing food items from a supermarket. These prior art systems assist a consumer with evaluation or preparation of meals having a desired nutritional profile or other preselected characteristics.

However, these systems are inadequate to properly categorize and tabulate nutritional information for meals prepared by someone else. For example, a patron of a meal preparation establishment, such as a restaurant or delicatessen, is usually totally unaware of specific or detailed nutritional information or content for these meal items. At best, some quick service restaurants provide average nutritional information for selected standardized meal items. This information can be quite inaccurate for specific meals prepared at these establishment, especially when a consumer customizes the meal items to add or delete meal components of the standardized items. The consumer, using prior art systems, is not in a position to evaluate nutritional information of the specific meal that was prepared by the establishment, nor is the consumer able to accurately evaluate the effect of any customizations to the meal items.

It is another disadvantage of prior art systems in that they fail to differentiate food items purchased for several people, or several meals. The prior art systems either are designed for operation with a single consumer, or nutritional information is coalesced into a single value, or averaged to provide an inaccurate value for a specific meal consumed by a specific consumer.

SUMMARY OF THE INVENTION

The present invention provides apparatus and method for simply, efficiently and economically providing a food order content receipt that reports nutritional information for meal items prepared by a person other than a consumer. By incorporating the present invention, consumers who either need to know, or are curious about, the nutritional information of meal items prepared for them can be provided with desired information. The present invention addresses customization of otherwise standardized meal items, and provides for aggregation of nutritional information for orders having several meal items, and for those service orders including meals for several persons.

According to one aspect of the invention for a method for reporting nutritional information of food items served to a customer of a quick service restaurant, the method includes the steps of receiving a service order from the customer requesting a meal including a first meal item and a second meal item; filling the service order by assembling the meal items from a plurality of standardized meal components, retrieving from a database a nutritional information component for each of the plurality of standardized meal components, aggregating, for each meal item, the nutritional information components for each of the plurality of standardized meal components included in each respective meal item to form a first aggregated nutritional component and a second aggregated nutritional component, printing an itemized list of the meal items and the aggregated nutritional components to produce a nutritional report, and providing the nutritional report to the customer.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 1 is a sample food order content receipt produced according to the preferred embodiment of the present invention;

FIG. 2 is a flowchart illustrating a preferred process of the present invention;

FIG. 3 s a detailed flowchart illustrating a preferred series of steps for the FILL ORDER step illustrated in FIG. 2;

FIG. 4 is a conceptual view illustrating a hierarchy of food items according to a preferred embodiment of the present invention;

FIG. 5 is a process flow diagram illustrating a preferred embodiment of the present invention;

FIG. 6 is a representative perspective view of a computer system for implementing a preferred embodiment of the present invention; and FIG. 7 is a block schematic diagram illustrating components of the computer system shown in FIG. 6.

DESCRIPTION OF THE PREFERRED EMBODIMENT

FIG. 1 is a sample food order content receipt 10 produced according to the preferred embodiment of the present invention. Receipt 10 identifies a first meal $12_1$ and a second meal $12_2$ ordered by a customer of a food preparation establishment. In the preferred embodiment, the food preparation establishment is a quick service restaurant that is characterized as having standardized meal items made up of standardized meal components. While the following description is made in the context of the preferred embodiment, it is understood that modifications to the described system enable application of the present invention to other food preparation establishments, such as full service restaurants, delicatessens, convenience shops, food vendors, sports stadium concessionaires, etc.

Each meal $12_i$ includes several meal items $14_{i,j}$ that are standardized, unless otherwise customized by the customer. Standardization, in the context of the preferred embodiment, refers to predefinition of ingredients and components in preselected and repeatable portion sizes. Each meal item $14_{i,j}$ that may be ordered from the quick service restaurant is made up from a plurality of standardized meal components. For example, first meal $12_1$ includes a roast beef sandwich as first meal item $14_{1,1}$ and a large cola as second meal item $14_{1,2}$.

Receipt 10 includes a price column 16 and one or more nutritional information columns $18_m$. Receipt 10 associates, for each meal item $14_{i,j}$, a price and specific nutritional information corresponding to the particular nutritional column 18. For example, meal item $14_{1,1}$, a roast beef sandwich, has a price of $4.00 listed in price column 16. First nutritional information column $18_1$ lists associated calorie information and second nutritional information column $18_2$ lists associated fat content. Other nutritional information, such as calories (of protein, of fat, of carbohydrates, totals), daily allowances (USRDA), any synthetic chemicals, toxins, preservatives, all nutrients (water, carbohydrates, fats, proteins, vitamins, minerals, fiber), comparable numbers from competitors, could be reported to the customer. In some instances, it may be desirable to allow a customer to select a specific type of report that lists customer desired information, or to otherwise customize the particular nutritional information reported to the customer. Receipt 10 may also include fields for store identification, time, date, register number, order number, amount tendered, change due, etc.

It is one feature of a quick service restaurant to permit customers to customize the otherwise standardized meal items. A meal item $14_{i,j}$ may be customized by adding or deleting one or more standardized meal components $20_{i,j,k}$. For example, for first meal $12_1$, first meal item $14_{1,1}$ has a first meal component $20_{1,1,1}$ deleted and a second meal component $20_{1,1,2}$ added. Any price adjustments reflected by the modification of the meal components would be entered into price column 16, and any nutritional information appropriate for nutritional information columns $18_m$ are listed next to the written description of the particular meal component $20_{i,j,k}$.

For each meal $12_i$, entries in price column 16 and nutritional information columns $18_m$ are aggregated into a sub-total row $22_i$. Thus, first meal $12_1$ has a first sub-total row $22_1$ that lists the total price of meal items $14_{1,j}$ (including any modifications due to customization of a particular meal item), and aggregated nutritional information. Similarly, any other meals included on the same food order content receipt 10 are also aggregated into sub-totals.

In FIG. 1, the price, total calorie content, and fat grams for each meal, meal item and customizing meal component are listed. Receipt 10 also includes a total field 24 for aggregating the prices from the sub-total fields $22_i$. In some embodiments, it may be desirable to total not only price column 16, but also nutritional information columns $18_m$.

According to the preferred embodiment, receipt 10 includes nutritional commentary fields $26_i$, one per meal item $12_i$. The nutritional commentary fields $26_i$ provides the customer with additional information about the corresponding meal $12_i$, meal item $14_{i,j}$, or customizing meal component $20_{i,j,k}$. The contents of the nutritional commentary fields $26_i$ may, in some cases, be predefined for particular situations, or randomly selected from a pool of appropriate nutritional commentary messages to enhance a repeat customer's experience when patronizing a food preparation establishment using the present invention.

In some instances, part of a service order may include meal items prepared by a customer at a "self-serve" station of the food-preparation establishment. The food preparation establishment may optionally provide the customer with information to calculate a nutritional content of the food components the customer chooses. Optionally, receipt 10 may include a field for entering this information. In some cases, an entry for these self-serve items on receipt 10 may be blank, include a range of values, include an average value, or otherwise indicate that the entry is unknown or approximate. If the customer chooses standardized portions of food components, entry of this information permits especially accurate reporting of corresponding nutritional information.

FIG. 2 is a flowchart 200 illustrating a preferred process, steps 205–230, for a food order content receipt printing method of the present invention. Flowchart 200, preferably implemented using a conventional point-of-sale (POS) system, begins at step 205, RECEIVE ORDER FROM CUSTOMER. POS will hereafter refer generically to retail systems employed in merchant facilities for processing customer orders and money transactions, including such systems as electronic cash registers (ECRs), and the like. At step 205, a customer provides the quick service restaurant with a service order identifying one or more meals, each having one or more meal items. The meal items will be assembled later from predefined portions of standardized meal components. The service order may include one or more customized meal items. After receiving the order, the system advances to step 210, ACCESS NUTRITION INFO FOR ORDER.

It is at step 210 wherein the food preparation establishment performs a database lookup to extract desired nutritional information that corresponds to the meal items, standardized and customized standardized (e.g., predefined meals that are modified per a customer's request), identified in the service order received at step 205. Following step 210, the system performs step 215, AGGREGATE NUTRITION INFO FOR MEAL COMPONENTS TO BE USED IN MEAL. It is at step 215 wherein the nutrition information, and price information when price is included as it is on receipt 10 shown in FIG. 1, is associated with the standardized meal items and meal components and the sub-total amounts are calculated.

Following step 215, the system performs step 220, PRINT ITEMIZED LIST OF MEAL ITEMS AND ASSOCIATED NUTRITIONAL INFORMATION as a nutritional report. The nutritional report of step 220 is preferably as shown by receipt 10 shown in FIG. 1. However, in alternate embodiments of the present invention, the nutritional report may be separate from an amount due receipt typically provided by the point-of-sale system.

After printing receipt 10 at step 220, the process, at step 225, performs a PROVIDE LIST TO CUSTOMER step. Step 225 provides feedback to the customer regarding the nutritional information of the meal items actually making up the service order. After step 225, the process concludes with step 230, FILL ORDER. It is at step 230 wherein the requested standardized and customized meal items are prepared and provided to the customer.

In the preferred embodiment, all meal items are assembled from standardized portions of meal components having predetermined nutritional characteristics. For the preferred embodiment, use of standardized portions of meal components permits predetermination of nutritional information for standardized meal items. This information is stored in the database that is accessed at step 210. Additionally, storing nutritional information for the standardized portion information allows the nutritional information reported to the customer to accurately match the nutritional content of the food prepared for the customer.

In some applications, it may be necessary for detailed nutritional analyses, such as by a commercially available testing lab, to establish nutritional information for the standardized meal components used in assembling the meal items of the service order.

A reordering of steps 205–230 produces an alternate process that may be better suited to a full-service restaurant. By executing process step 230 immediately after step 205, and following it by steps 210–225, an alternate preferred embodiment is possible in which a service order is filled prior to generating the nutritional report. Thus, the nutritional report includes those items and components that were used in preparing any particular meal. Such a system allows some additional flexibility for variation in the meal preparation process as the meal component information does not have to be known in advance as accurately as with the preferred embodiment.

In another alternate embodiment, a service order may be made by a customer directly entering information on a touch-screen. Thereafter, the customer may receive a pre-purchase report, such as by use of the touch-screen, and approve the service order after reviewing the nutritional information. A similar result is achieved by providing the customer with a printed nutritional report prior to finalizing the service order. Such pre-purchase approval permits the customer to react to the aggregated nutritional information for the meal items of the pending service order.

FIG. 3 is a detailed flowchart illustrating a preferred series of steps for step 230 illustrated in FIG. 2. Step 230 includes steps 300–315 to fill a service order from a customer. At step 300, meal items of the service order are identified. Next, at step 305, standardized meal components making up the meal items identified in step 300 are identified. This identification includes any customization instructions requested by the customer and conveyed via the service order. The customization information includes additional meal components to be added, meal components to be deleted, or some combination of both.

After identifying the standardized meal components, step 310 assembles the meal components into the meal items identified in step 300. Step 310 accounts for any customization information submitted by the customer. After assembling the meal items, the meal items are assembled into the appropriate meals (step 315). The assembled meals are then served to the customer.

FIG. 4 is a conceptual view illustrating a hierarchy of food items according to a preferred embodiment of the present invention. As illustrated, a meal 400 is made up of one or more meal items $405_i$. Further, each meal item $405_i$ is made up of one or more standardized meal components 410.

FIG. 5 is a process flow diagram 500 illustrating the preferred embodiment of the present invention. A customer 505 provides a service order to an order taker 510 who preferably operates the POS system. Order taker 510 receives the service order and enters requested meal items into a database processing system 515. Database processing system 515 returns nutrition information and optionally associated price information corresponding to the requested meal items to order taker 510. Order taker 510 prints, in the preferred embodiment, receipt 10 shown in FIG. 1 and provides this nutritional report to customer 505.

Order taker 510 also provides a list of the meal items to an order filler 520 who assembles the requested meal items from standardized meal components and provides the meal to customer 505. The identification of meal items provided to database processing system 515 and order filler 520 includes any customization information for the standardized meal items, such as extra or additional components, or both, or for components to be removed.

In various embodiments, depending upon desired implementations, it is possible for order taker 510 to provide order filler 520 with meal item information prior to, or subsequent to, presentation of the nutritional report to customer 505.

FIG. 6 is an illustration of a workstation 610, which includes a computer system 612 coupled to a fixed disk 614, a keyboard 616, a mouse 618, and a monitor 620. Monitor 620 is shown with a display surface 622. A floppy disk 624, capable of storing computer accessible information and program information, may also be optionally part of workstation 610. The examples that follow refer to an image being displayed on display surface 622 of monitor 620 resulting from access and processing of database information stored on fixed disk 614 upon execution of the preferred embodiment. However, the invention is equally applicable to variations such as where the display device is a printer and the display surface is a printed page, or the display device is some other pixelated display device. The source of the database information also need not be disk 614, but could be keyboard 616, disk 624, or some other input means not shown (such as a communications channel or network link to a centralized database), or a combination of the above. Additionally, disk 624 may include suitable program instruction to cause workstation 610 to execute the process steps shown in FIG. 2 and FIG. 3 to print receipt 10 shown in FIG. 1.

FIG. 7 is a block diagram of computer system 612. Computer system 612 is shown with a central processing unit ("CPU") 714, random access memory ("RAM") 716, a disk 720 (e.g., 614 in FIG. 6), a mouse driver 728, a keyboard driver 726, an element memory 722, an image memory 724, an optional graphics accelerator 736, a printer driver 730, and a display driver 732 all coupled by a computer bus 734. Display driver 732 is shown coupled to a graphics display 710 (e.g., monitor 620) and printer driver 730 is coupled to a printer 712. In variations of computer system 612, one or more elements might be combined or removed, or modified, depending upon a particular embodiment. For example image memory 724 might be a part of RAM 716, or mouse driver 728 and keyboard driver 726 might be combined. FIG. 7 also includes any interface cards, such as those employed by some POS systems (particularly ECR systems).

CPU 714 is used to process instructions of a nutritional report generation program to generate receipt 10, and possibly other computing tasks. Typically, CPU 714 controls the interaction of the items coupled to bus 734. For example, CPU 714 uses RAM 716 to store variables and data arrays used in processing nutritional and price data, disk 720 to permanently store instructions of the nutritional report generation program, mouse driver 728 to get input from a mouse 706 (mouse 618 shown in FIG. 6), and keyboard driver 726 to get input from a keyboard 704 (e.g., keyboard 616 shown in FIG. 6).

In a nutritional report generating operation, CPU 714 first moves a nutritional report generating program to more accessible nutritional program storage 720, and waits for meal item and customization information to be entered by an input device. Running the nutritional report program causes CPU 714 to read nutritional information from a database memory coupled to bus 734 to generate a nutritional report and corresponding price information of a service order submitted by a customer, which is then stored in image memory 724. The processing can either be done all by CPU 714, or some operations might be passed to graphics accelerator 736, or to a remote processing center for remote processing. Once the display image is generated, it can be moved from image memory 732 to display driver 732 or to printer driver 730, which outputs the image to one or more display devices.

In preferred embodiment, the details of the operation of computer system 612 needed to generate receipt 10 from a service order and stored database information are determined by the nutritional report generation program stored in storage 720. The details of these operations are shown in the flowcharts and process drawings of FIGS. 2–5.

In a preferred embodiment of the present invention, computer system 610 is a point-of-sale system employing diskless workstations accessing storing and processing resources over a computer network. Monitor 620 may optionally be a touch screen for entry of service orders and display of price and nutritional information prior to generation of receipt 10.

In conclusion, the present invention provides a simple, efficient solution to a problem of nutritional reports of food prepared and served by restaurants and the like. While the above is a complete description of the preferred embodiments of the invention, various alternatives, modifications, and equivalents may be used. Therefore, the above description should not be taken as limiting the scope of the invention which is defined by the appended claims.

What is claimed is:

1. A method for reporting nutritional information of food items served to a customer of a restaurant, comprising the steps of:

receiving a service order from the customer requesting a meal including a first meal item and a second meal item wherein each said meal item includes a standard set of meal components and wherein said service order specifies a modified set of meal components different than said standard set; thereafter filling said service order by assembling said meal items specified by said modified set of meal components from a plurality of standardized meal components;

retrieving from a database a nutritional information component for each of said plurality of standardized meal components used in said modified set of meal components;

aggregating, for each meal item, said nutritional information components for each of said plurality of standardized meal components included in each respective meal item to form a first aggregated nutritional component and a second aggregated nutritional component;

printing an itemized list of said meal items and said aggregated nutritional components to produce a nutritional report; and providing said nutritional report to the customer.

2. The reporting method of claim 1 wherein the customer receives a receipt identifying said meal items and corresponding price information associated with said meal items, said nutritional report is integrated onto said receipt.

3. The reporting method of claim 2 wherein said nutritional report includes a printed nutritional commentary of a particular one meal item of said meal items.

4. The reporting method of claim 1 wherein said service order includes a third meal item and a fourth meal item for a second customer, and said aggregating step aggregates said nutritional information to form a third aggregated nutritional component and a fourth aggregated nutritional component for said third and fourth meal items.

5. The reporting method of claim 4 wherein the customer receives a receipt identifying said meal items and corresponding price information associated with said meal items, said nutritional report is integrated onto said receipt.

6. The reporting method of claim 5 wherein said nutritional report includes a printed nutritional commentary of a particular one meal item of said meal items.

7. The reporting method of claim 4 wherein said nutritional information for said first and second meal items are segregated into a first sub-total separate from said nutritional information of said third and fourth meal items which are segregated into a second sub-total.

8. The reporting method of claim 7 wherein said sub-totals are aggregated into a total.

9. A method for reporting nutritional information of food items served to a customer of a restaurant, comprising the steps of:

assembling a plurality of meal items from a plurality of standardized meal components;

receiving a service order from the customer requesting a meal including a first meal item from said plurality of meal items wherein each said meal item includes a standard set of meal components and wherein said service order specifies a modified set of meal components different than said standard set;

filling said service order by retrieving said first meal item specified by said modified set of meal components;

retrieving from a database a nutritional information component for each of said plurality of standardized meal components used in said modified set of meal components;

aggregating, for said first meal item, said nutritional information components for each of said plurality of standardized meal components included in said first meal item to form a first aggregated nutritional component;

printing an itemized list of said first meal item and said first aggregated nutritional component to produce a nutritional report; and providing said nutritional report to the customer.

10. The reporting method of claim 9 wherein said service order includes a request for a second meal including a second meal item from said plurality of meal items, said filling step retrieves said second meal item, said retrieving step retrieves said nutritional information components for each of said plurality of standardized meal components making up said second meal item, said aggregating step forms a second aggregated nutritional component from said nutritional information components corresponding to said plurality of standardized meal components used in said second meal item, and said printing step produces said nutritional report including said second meal item and said second aggregated nutritional component.

11. A method for reporting nutritional information of a food item served to a customer of a restaurant, comprising the steps of:

receiving a service order from the customer requesting a meal including a meal item wherein each said meal item includes a standard set of meal components and wherein said service order specifies a modified set of meal components different than said standard set; thereafter filling said service order by assembling said meal item specified by said modified set of meal components from a plurality of standardized meal components;

retrieving from a database a nutritional information component for each of said plurality of standardized meal components used in said modified set of meal components;

aggregating, for said meal item, said nutritional information components for each of said plurality of standardized meal components included in said meal item to form an aggregated nutritional component;

printing an itemized list of said meal item and said aggregated nutritional component to produce a nutritional report; and providing said nutritional report to the customer.

12. The reporting method of claim 11 wherein said meal item is a standardized meal item having a preaggregated nutritional component, and wherein said retrieving step retrieves said preaggregated nutritional component.

13. The reporting method of claim 12 wherein said service order includes a customized standardized meal item having a standardized meal component added to said customized standardized meal item.

14. The reporting method of claim 13 wherein said retrieving step retrieves an additive nutritional information component from said database, and wherein said aggregating step adds said additive nutritional information component to said preaggregated nutritional component to produce said aggregated nutritional component for said customized standardized meal item.

15. The reporting method of claim 14 wherein said service order includes a customized standardized meal item having a standardized meal component removed from said customized standardized meal item.

16. The reporting method of claim 15 wherein said retrieving step retrieves a subtractive nutritional information component from said database, and wherein said aggregating step subtracts said additive nutritional information component from said preaggregated nutritional component to produce said aggregated nutritional component.

17. A method for reporting nutritional information of a food item served to a customer of a food preparation establishment, comprising the steps of:

receiving a service order from the customer requesting a meal including a first meal item and a second meal item wherein each said meal item includes a standard set of meal components and wherein said service order specifies a modified set of meal components different than said standard set; thereafter retrieving from a database a nutritional information component for each of a plurality of standardized meal components to be used in said modified set of meal components;

aggregating, for each said meal item, said nutritional information components for each of said plurality of standardized meal components included in said meal items to form a first and a second aggregated nutritional component corresponding to respective ones of said meal items;

printing an itemized list associating said meal item with a first aggregated nutritional component and said second meal item with a second aggregated nutritional component to produce a nutritional report; thereafter filling said service order by assembling said meal items specified by said modified set of meal components from said plurality of standardized meal components; and providing said nutritional report to the customer.

18. A system for reporting nutritional information of a meal served to a customer of a food preparation establishment, comprising:

a database for storing nutritional information components of standardized food components used by the food preparation establishment; and a point-of-sale system, coupled to said database, for receiving a service order from the customer requesting a particular meal including a first meal item and a second meal item wherein each said meal item includes a standard set of meal components and wherein said service order specifies a modified set of meal components different than said standard set, said point-of-sale system retrieving from said database a plurality of specific nutritional information components for each of a plurality of standardized meal components to be used in said modified set of meal components, said point-of-sale system for aggregating, for each said meal item, said specific nutritional information components for each of said plurality of standardized meal components included in said meal items to form a first and a second aggregated nutritional component corresponding to respective ones of said meal items, said point-of-sale system for printing an itemized list associating said meal item with a first aggregated nutritional component and said second meal item with a second aggregated nutritional component to produce a nutritional report.

* * * * *